United States Patent [19]
Srinivasan

[11] Patent Number: 5,979,192
[45] Date of Patent: Nov. 9, 1999

[54] FIN BLADE ASSEMBLY

[75] Inventor: Seshadri Srinivasan, Worthington, Ohio

[73] Assignee: Owens Corning Fiberglas Technology, Inc., Summit, Ill.

[21] Appl. No.: 09/102,796

[22] Filed: Jun. 23, 1998

[51] Int. Cl.[6] .................................................. C03B 5/44
[52] U.S. Cl. ................................ 65/498; 65/512; 425/66
[58] Field of Search ........................... 65/498, 511, 512; 264/165; 425/66; 165/148, 151, 47, 58, 67, 183

[56] References Cited

U.S. PATENT DOCUMENTS

| | | | |
|---|---|---|---|
| 3,522,025 | 7/1970 | Smith | 65/512 |
| 3,708,271 | 1/1973 | Loewenstein et al. | 65/512 |
| 3,867,118 | 2/1975 | Russell | 65/512 |
| 3,867,119 | 2/1975 | Kasuga et al. | 65/498 |
| 3,912,477 | 10/1975 | Brady et al. | 65/499 |
| 4,018,586 | 4/1977 | Cates, Jr. et al. | 65/512 |
| 4,049,412 | 9/1977 | Dent, Jr. et al. | 65/481 |
| 4,140,506 | 2/1979 | Machlan | 65/471 |
| 4,197,103 | 4/1980 | Ishikawa et al. | 65/478 |
| 4,310,602 | 1/1982 | Martin, Jr. | 428/596 |
| 4,325,722 | 4/1982 | Jensen | 65/512 |
| 4,328,015 | 5/1982 | Melan et al. | 65/481 |
| 4,330,311 | 5/1982 | Jensen | 65/498 |
| 4,332,602 | 6/1982 | Jensen | 65/498 |
| 4,433,991 | 2/1984 | Melan et al. | 65/496 |
| 4,566,890 | 1/1986 | Hostler et al. | 65/512 |
| 4,566,891 | 1/1986 | Briar et al. | 65/511 |
| 4,824,457 | 4/1989 | Jensen | 65/488 |
| 5,244,483 | 9/1993 | Brosch et al. | 65/493 |

*Primary Examiner*—Sean Vincent
*Attorney, Agent, or Firm*—Inger H. Eckert

[57] ABSTRACT

A glass fiber forming apparatus including a fin blade assembly having a manifold and a plurality of fins extending from the manifold. The fins are located beneath a bushing tip plate in proximity to and between the rows of tips to maintain a desired temperature among the glass filaments attenuated from the tips. The manifold is offset from the fin blades so as to allow clear visibility of the tip plate and unimpeded air flow passage through the fin blades during the glass fiber forming operation.

14 Claims, 4 Drawing Sheets

FIN BLADE ASSEMBLY

TECHNICAL FIELD AND INDUSTRIAL APPLICABILITY OF THE INVENTION

This invention relates to a fin blade assembly. More particularly, this invention relates to a fin blade assembly utilized to cool the orifices of a bushing through which glass fibers are attenuated in a glass fiber forming operation. The fin blade assembly is generally comprised of a manifold with heat transfer means and a plurality of fins which extended from the manifold and pass between adjacent rows of nozzles in a bushing tip plate. The manifold is offset from the fin blades so as to allow visibility of the tip plate during glass fiber forming.

BACKGROUND OF THE INVENTION

In a conventional glass fiber forming operation, a container referred to as a bushing is used to hold molten glass. The bottom of the bushing contains a plurality of nozzles or tips having a cone-like shape called a bushing tip plate from which the molten glass is drawn to be formed into multiple thin streams of glass. The glass stream flowing through the nozzles are attenuated by gathering them into a strand at a gathering point and winding them on a conventional rotating cylindrical winder.

The conventional glass fiber forming operation also includes the utilization of fin blade assemblies to cool the bushing tips. The fin blade assembly is generally comprised of a plurality of fins that extend from a manifold between adjacent rows of tips in the bushing tip plate. The manifold contains a heat transfer medium, such as a fluid and/or air stream as well known in the art, so that heat can be removed from the surface of each of the fins to the manifold so as to cool the nozzles directly below the tip plate and maintain the tip plate at a desired temperature during the glass fiber forming operation.

Dual manifold assemblies may be utilized in a conventional glass fiber forming operation as described above. In a dual manifold assembly, two manifold members are spaced apart from each other in a horizontal plane and are operatively connected by virtue of the fins extending between each of the manifolds. Each half of the dual manifold assembly is the mirror image of the other. One or more bushing assemblies may be spaced between the manifolds above the fins for cooling the fin plate. For a more detailed discussion of the manufacture of glass fibers, reference is made to U.S. Pat. Nos. 4,018,586 and 4,328,015, incorporated herein by reference.

One of the problem associated with the conventional fin blade assembly is that during the glass fiber forming operation, the fin manifold physically obstructs air flow adjacent the fins resulting in reduced localized heat loss from the tip plate to the fins. It is also a common problem with heretofore known fin blade assemblies that the location of the manifold relative to the fins impedes the visibility of the tip plate thereby preventing inspection of the tip plate during attenuation of the glass fibers.

It is seen then that it would be desirable to have an improved fin blade assembly which allows unimpeded visibility of the tip plate and allows unobstructed cooling air flow across the nozzle tips. Accordingly, an object of the present invention is to provide an improved fin blade assembly for use in producing glass fibers. It is another object of the present invention to provide an improved fin blade assembly by modifying a conventional glass fiber forming apparatus to provide unimpeded air flow and visibility of the tip plate during glass fiber forming. Specifically, and according to the present invention, the manifold is offset from the fin blades so as to allow visibility of the tip plate and unobstructed flow of air through the flow passages between the fin blades during glass fiber forming.

SUMMARY OF THE INVENTION

The present relates to a glass fiber forming apparatus including a fin blade assembly for operatively controlling the temperature in an attenuation zone of a glass fiber filament forming bushing. The bushing includes a tip plate with a plurality of spaced bushing tips extending into the attenuation zone. The fin blade assembly includes a plurality of cooling fins positioned in proximity to the bushing tips and a manifold offset above the tip plate in heat transfer relationship to the fins to remove heat from the cooling fins.

The manifold of the fin blade assembly is offset from the cooling fins so as to allow clear visibility of the tip plate and unimpeded air flow passage through the cooling fins during glass fiber forming operation.

BRIEF DESCRIPTION OF THE DRAWINGS

Further features and other objects and advantages of this invention will become clear from the following detailed description made with reference to the drawings in which.

DETAILED DESCRIPTION AND PREFERRED EMBODIMENTS OF THE INVENTION

Figure 1:
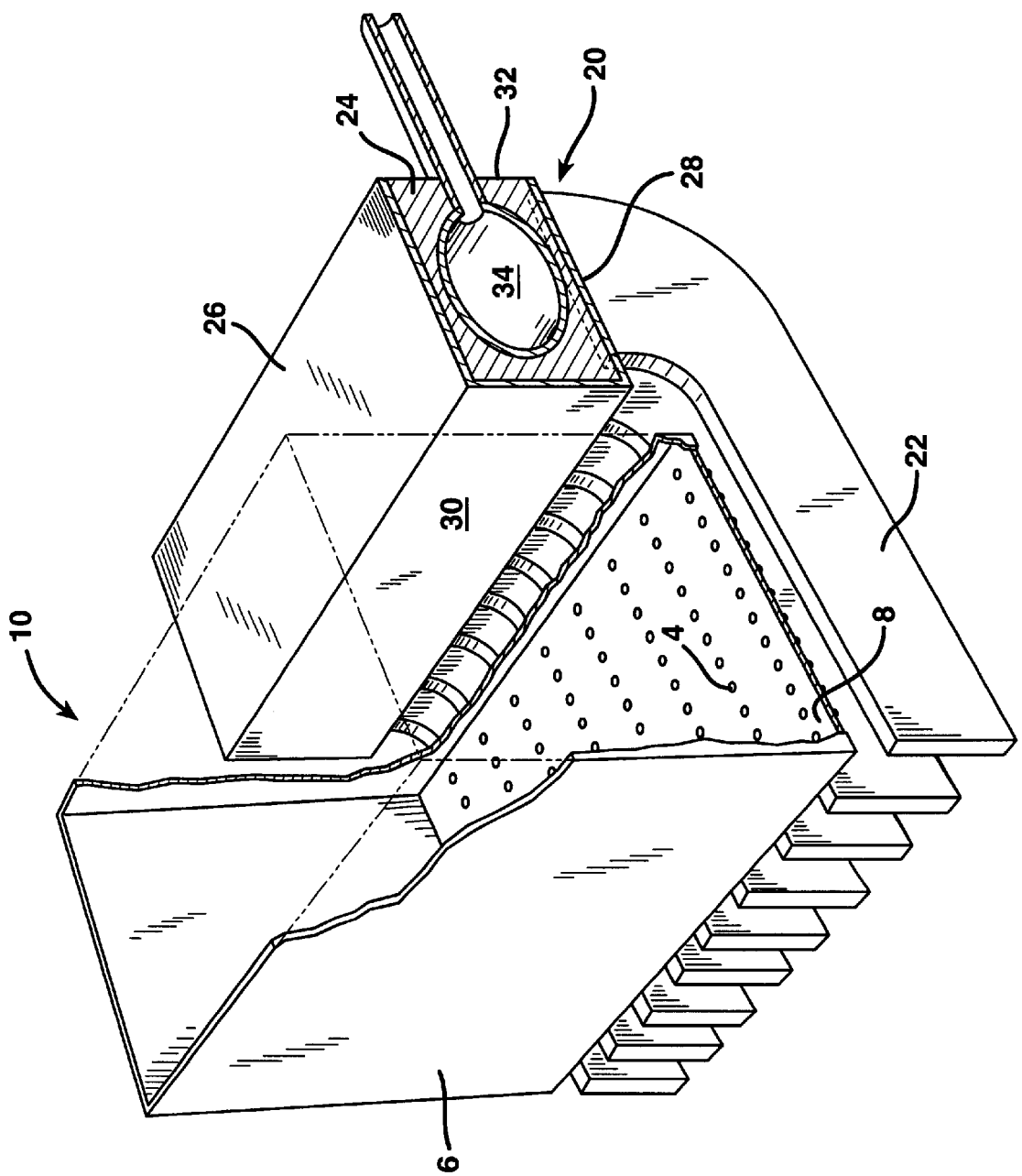
FIG. 1 is a perspective view of a fin assembly constructed in accordance with the present invention.

Referring now to FIG. 1, wherein like reference characters represent like elements, there is illustrated a glass fiber forming apparatus 10. The glass fiber forming apparatus 10 includes rows of cone-liked shaped tips 4 on the bottom of a glass fiber filament forming bushing 6 containing molten glass (not shown). The rows of bushing tips 4 form a bushing tip plate 8 from which the molten glass is drawn and formed into multiple thin streams of glass fibers. The thins streams of glass fibers flow through the bushing tips 4 and are attenuated by gathering them into a strand at a gathering point and winding them on a conventional rotating cylindrical winder as well known in the art.

The glass fiber forming apparatus 10 includes a manifold 24 and a fin blade assembly 20. The manifold 24 includes a top surface 26 and an opposing spaced apart bottom surface 28 interconnected by a front surface 30 and a rear surface 32. The manifold 24 includes a heat transfer channel 34 which extends the longitudinal length of the manifold 24. A suitable coolant such as water or air is passed through the heat transfer channel 34 to remove heat from the bushing tips 4 through the cooling fins 22 to maintain the tip plate 8 at a desired temperature during the fiber forming operation as well known in the art.

The fin blade assembly 20 includes a plurality of cooling fins 22 which extend from the manifold 24 between adjacent rows of bushing tips 4 in the bushing tip plate 8 to allow attenuated glass fibers to pass between the plurality of spaced cooling fins 22. It will be appreciated that the cooling fins 22 function to remove heat from the streams of glass fibers and transfer the heat to the manifold 24.

Figure 2:
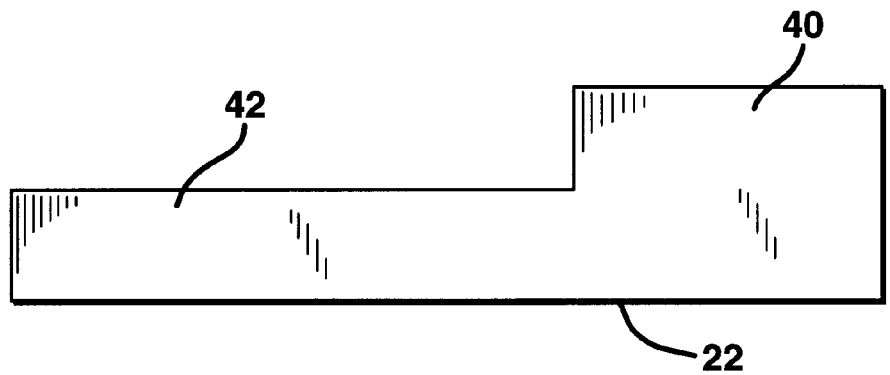
FIG. 2 is a side view of an alternate configuration of a cooling fin in accordance with the present invention.
Figure 3:
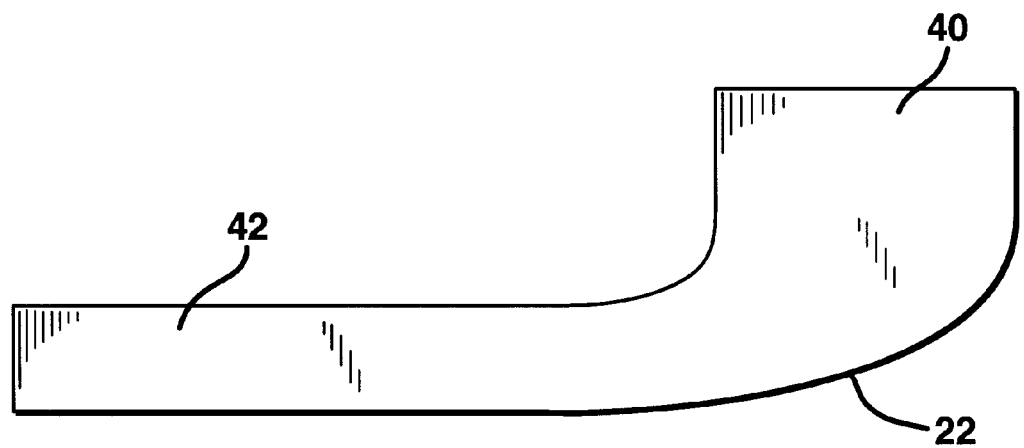
FIG. 3 is a side view of an alternate configuration of a cooling fin in accordance with the present invention.

The cooling fins 22 may be of most any suitable shape and design. For example, the cooling fins 22 may be of a rectangular cross-sectional shape and of a hollow design for carrying a heat transfer medium or the cooling fins may be of a solid rectangular cross-sectional shape. As shown in FIGS. 1–3, each cooling fin 22 includes a generally vertically extending first portion 40 and a second integral generally horizontally extending portion 42. The angle formed by the intersection of the first portion 40 and the second portion 42 may be of a generally rectangular profile as shown in FIG. 2 or of a generally curved profile as shown in FIG. 3. The width of the first portion 40 may be substantially in excess of the thickness of the cooling fin and wider than the second portion 42.

Each cooling fin 22 extends generally in parallel alignment adjacent the rows of bushing tips 4 from the manifold 24 in a cantilevered manner with a free end of each cooling fin 22 being unsupported. The cooling fins 22 may be operatively attached to the manifold 24 by soldering and the like as well known in the art. In a preferred embodiment, a first end 40 of each cooling fin 22 is operatively attached to the bottom surface 28 of the manifold 24 and extends generally downwardly below the bushing tip plate 8 and horizontally away from the manifold between adjacent rows of bushing tips 4 along the bottom of the bushing tip plate 8.

It will be appreciated that by offsetting the cooling fins 22, the manifold 24 may be positioned away from the attenuation zone and above the plane of the tip plate 8. As a result, the bottom of the tip plate 8 and the area between the cooling fins 22 is not obstructed by the manifold 24 and may be readily observed during the glass fiber forming operation. In addition, because the manifold does not block the area between the cooling fins 22, air may freely flow between the cooling fins and across the bottom of the tip plate 8.

The patents and references described herein are hereby incorporated by reference.

Figure 4:
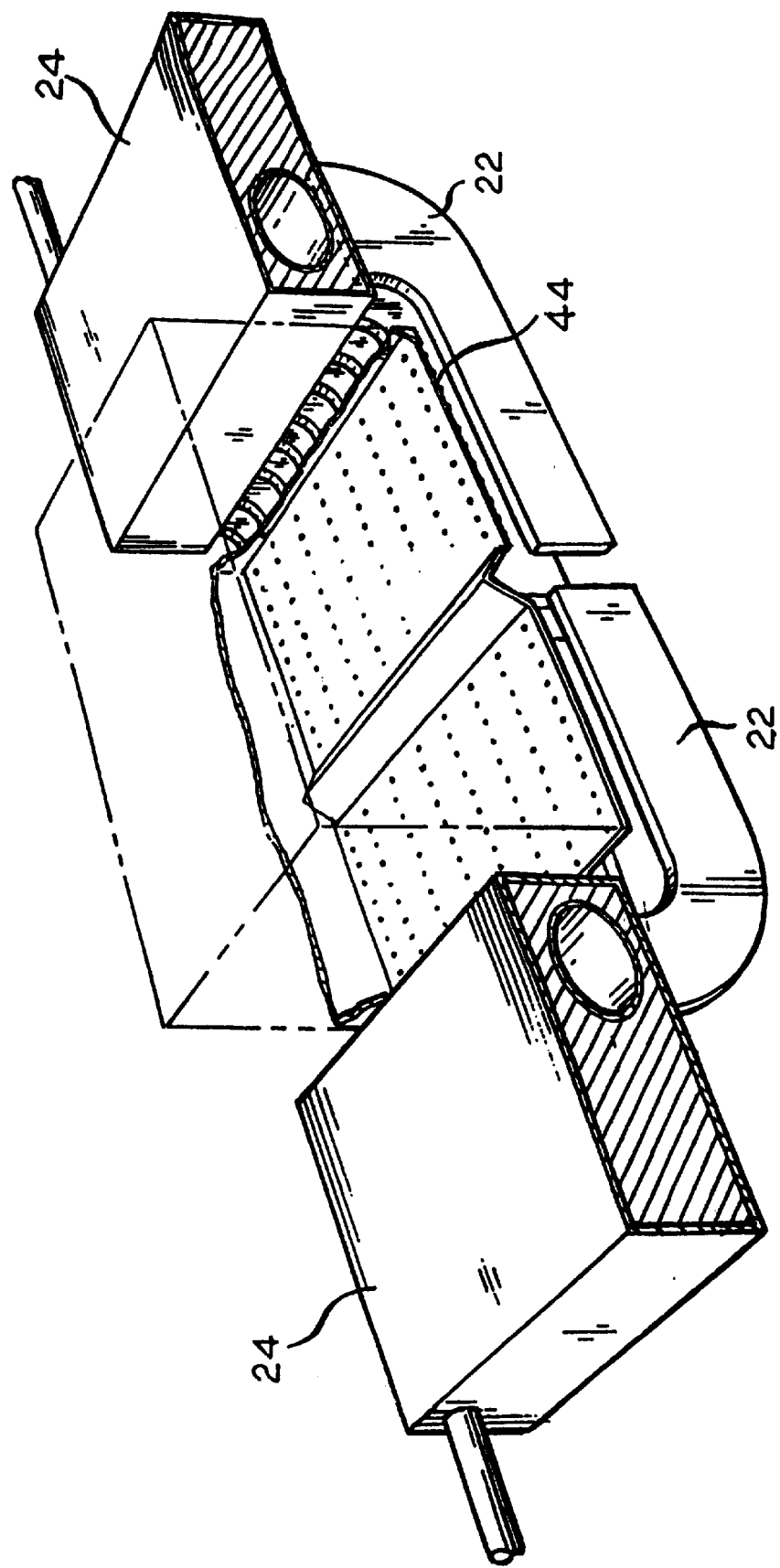
FIG. 4 is a perspective view of a fin assembly constructed in accordance with the present invention for a double bottom bushing.
Figure 5:
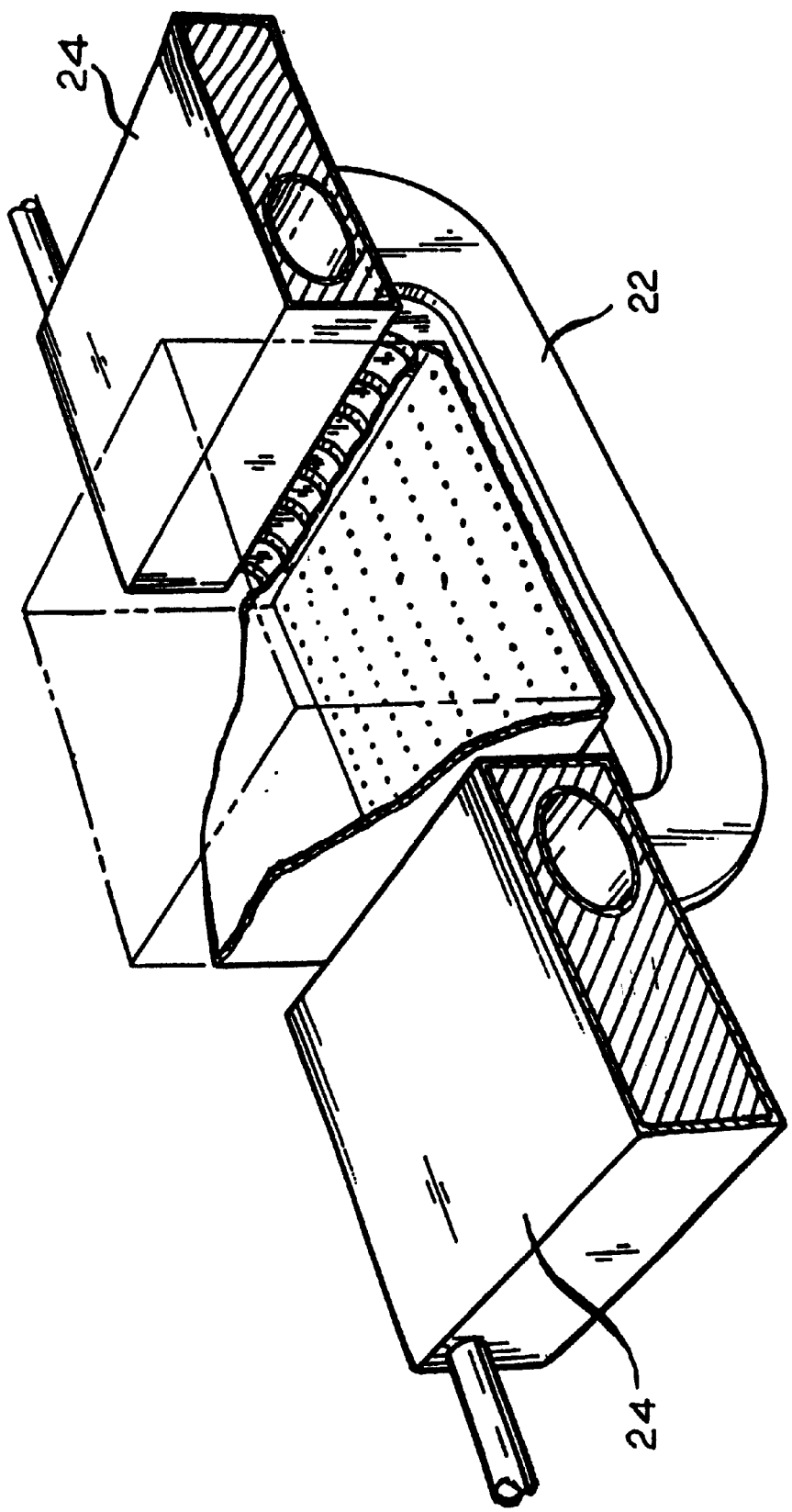
FIG. 5 is a perspective view of a fin assembly constructed in accordance with the present invention for dual manifold fins.

Thus there has been described the presently preferred embodiment of the invention which fulfills all the objects and advantages sought therefor. Many changes, modifications, variations and other uses and application of the subject invention will become apparent to those skilled in the art after considering this specification together with the accompanying drawings and claims: For example, as shown in FIG. 4, a set of opposing cooling fins 22 in accordance with the present invention may extend downwardly and inwardly from a pair of manifolds 24 underneath of a double bottom bushing tip plate 44. Each set of cooling fins 22 is operatively connected to a separate manifold 24 located on the opposing side of the tip plate as well known in the art. In yet another embodiment as shown in FIG. 5, a plurality of cooling fins 22 in accordance with the present invention extend downwardly from a pair of manifolds and operatively interconnect the manifolds 24. All such changes, modifications, variations and other uses and applications which do not depart from the spirit and scope of the invention are deemed to be covered by the invention and may be otherwise embodied within the scope of the following claims.

What is claimed is:

1. A glass fiber forming apparatus including a fin blade assembly for operatively controlling the temperature in an attenuation zone of a glass fiber filament forming bushing, said bushing having a tip plate with a plurality of spaced bushing tips extending into the attenuation zone, said fin blade assembly comprising:

a plurality of cooling fins positioned in proximity to the bushing tips; and a manifold positioned above the plane of the tip plate, wherein the manifold is in heat transfer relationship with the fins to remove heat from the cooling fins.

2. The glass fiber forming apparatus as defined in claim 1, wherein the fins extend downwardly from the manifold and beneath the tip plate.

3. The glass fiber forming apparatus as defined in claim 1, wherein the manifold further comprises a heat transfer channel containing a heat transfer medium.

4. The glass fiber forming apparatus as defined in claim 1, wherein the manifold further comprises a heat transfer channel containing a cooling gas.

5. The glass fiber forming apparatus as defined in claim 4, wherein the cooling gas is air.

6. The glass fiber forming apparatus as defined in claim 1, wherein the manifold is positioned above the attenuation zone to provide unimpeded air flow and visibility to the tip plate.

7. A fin blade assembly of a glass fiber forming apparatus; comprising:

a plurality of cooling fins positioned beneath a tip plate of a glass fiber filament forming bushing for forming glass fibers; and a manifold attached to and positioned above the plane of the tip plate for transferring heat from the cooling fins.

8. The fin blade assembly as defined in claim 7, wherein the cooling fins are attached beneath the manifold and extend horizontally beneath the tip plate.

9. The fin blade assembly as defined in claim 7, wherein the manifold is offset from the tip plate to provide unimpeded air flow and visibility to the tip plate.

10. The fin blade assembly as defined in claim 7, wherein the cooling fins include a first portion extending generally horizontal beneath the tip plate and a second portion extending generally vertical to the manifold.

11. The fin blade assembly as defined in claim 7, wherein the manifold further comprises a liquid heat transfer medium extending through the manifold to take heat away from the cooling fins.

12. A glass fiber forming apparatus including a fin blade assembly adapted to be placed between a plurality of tip rows on a tip plate in the bottom of a glass fiber bushing for forming glass fibers, the fin blade assembly comprising:

a manifold positioned above the plane of the tip plate; and a plurality of cooling fins attached to the manifold and extending downwardly from the manifold and adjacent the tip rows to cool the molten glass fibers as they are drawn from the tip plate.

13. The glass fiber forming apparatus as defined in claim 12, wherein the cooling fins include a first portion extending generally downwardly relative to the manifold and a second portion extending generally perpendicular to the first portion.

14. The glass fiber forming apparatus as defined in claim 12, wherein the intersection of the first and second portion is a curve.

* * * * *